United States Patent Office 2,796,054
Patented June 18, 1957

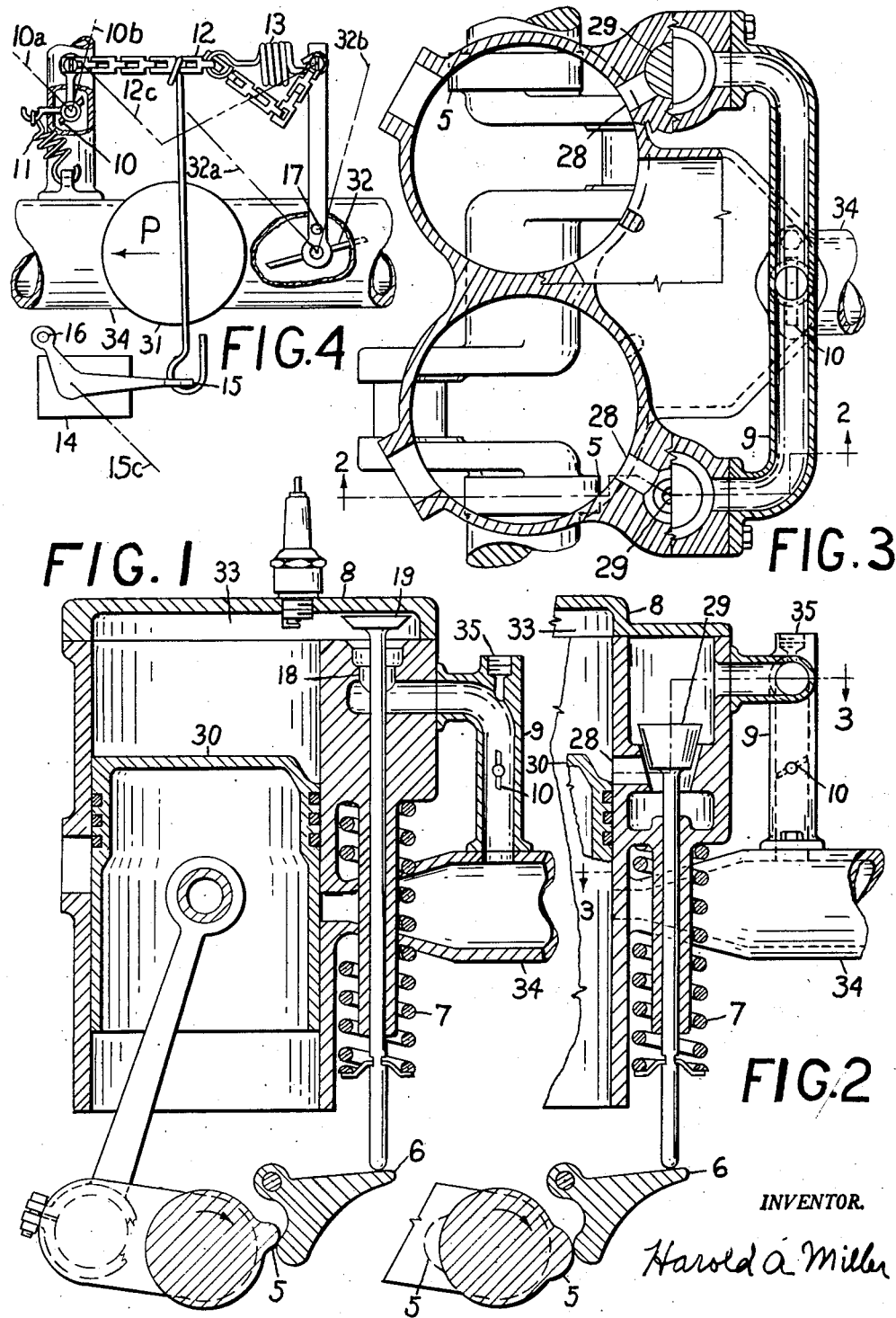

2,796,054
TWO CYCLE ENGINE CHARGE RECIRCULATOR

Harold A. Miller, San Diego, Calif.

Application July 29, 1955, Serial No. 525,246

2 Claims. (Cl. 123—65)

The invention relates to improvement in a two stroke cycle, spark ignition, engine, of fuel-air mixture charging type, and air charging type with fuel injection, in which a redundant charge is admitted for a big exhaust scavange at partial load and during compression the excess charge is recirculated through an engine cycle actuated valve and through a high load throttling valve back into feed manifold; and the objects of my improvement are, first, to reduce exhaust dilution in the combustion space charge at partial load to provide good idling and make practical the use of a cylinder head of high compression ratio; second, to make available an automatic spark retard that advances its timing to increase the engine thermal efficiency toward its maximum with increase in altitude above sea level at heavy load.

Two forms of my invention are illustrated in the accompanying drawing in which—

Figure 1 is a vertical section of the engine with cycle charge recirculation cut off by a valve; Fig. 2 is a vertical section of an optional form of the invention with cycle charge recirculation cut off by the piston; Fig. 3 is a view 3—3 that completes the picture of the charge recirculation manifold for a multi-cylinder engine; Fig. 4 is a detailed view that coordinates the decrease in recirculated feed charge with increased throttle opening.

In Fig. 1 the engine cycle actuated valve 19 opens and closes during the compression stroke. There are a variety of methods to do this including positive action closing (not shown) of the cycle valve itself. The crankshaft cam lobe 5 advances against the rocker arm 6 and opens the cycle valve 19. As lobe 5 rotates further and turns away from rocker arm 6 it permits spring 7 to close the cycle valve 19. During this time the compressing piston 30 increases the charge pressure which transfers a portion of the charge through the open cycle valve 19, as shown, into recirculating manifold 9.

In optional Fig. 2 during compression stroke the engine cycle actuated valve 29 opens and after limited engine rotation, piston 30 closes port 28 during compression stroke, followed by closing of cycle valve 29 before piston 30 opens port 28 again on power stroke. This permits a charge transfer into recirculating manifold 9 while cycle valve 29 and port 28 are simultaneously open, as shown. Ports 28 of equal size and location in their respective cylinders close with built in precision timing that insures equalized charges for combustion in a multi-cylinder engine.

The cycle valve 19 in Fig. 1 and cycle valve 29 in Fig. 2 should start open during the compression stroke but not before intake and exhaust are both closed, or nearly closed. Port 28 in Fig. 2 and cycle valve 19 in Fig. 1 should close during the compression stroke but as a minimum limit not earlier than that which provides a compression increment for sufficient charge transfer so that the remaining charge for combustion is small enough not to detonate when used with a cylinder head 8 of high compression ratio with spark timing at maximum thermal efficiency while high load valve 10 is wide open or nearly wide open at highest practical engine speed. Port 28 and cycle valve 19, as a minimum limit, closes early but sufficiently late so that the recirculated charge plus the small new charge required for idling provides an initial cylinder charge for sufficient scavange to prevent "loading up" of combustion chamber 33 with oil and heavy ends of fuel condensate that would interfere with easy starting or power response immediately after a long interval of slow speed idling. Fig. 2 shows port 28 located so as to close early during the compression stroke. Port 28 in Fig. 2 and cycle valve 19 in Fig. 1 should be closed as a maximum limit not later than earliest combustion, or spark timing, which provides a maximum charge transfer for minimum exhaust dilution of remaining charge during idling. The practical maximum limit closing point of port 28 or cycle valve 19 on or before earliest combustion provides a volume in the combustion chamber 33, while port 28 or cycle valve 19 is at the verge of recirculation cut off, that is approximately equal to the volume of new mixture or outside air entering throttle 32 for each initial cylinder charge during idling of the engine. Fig. 1 shows cam lobe 5 located to close valve 19 late during the compression stroke. The minimum flow area of port 28 and channel restriction 18 is as large as necessary so that the recirculated charge plus the small new charge required for idling provides an initial cylinder charge that is sufficient for reasonable good scavanging to prevent excessive "loading up" of combustion chamber 33 with oil and heavy ends of fuel condensate that would interfere with easy starting or power response immediately after a long interval of idling at high speed. The minimum limit closing point of port 28 and cycle valve 19, coincides with its practical maximum limit closing point when port 28 and channel restriction 18 contains the minimum flow area. With a larger flow area the designer has a choice in determining the optimum closing point. The optimum closing point is on the early side of the available choice as this reduces to the practical minimum the pumping losses of recirculation.

The cycle valve 19 should be open and cycle valve 29 simultaneously open with port 28 for a limited angle of engine rotation to limit recirculation reversal in the heavy load range. Mathematically it can be shown that the increased work of recompression of the reversal at heavy load does not exceed the reduced work of compression at light load for any angle up to approximately 45 degrees. The port 28 and cam lobe 5 of Fig. 2 and cam lobe 5 of Fig. 1 are drawn to provide approximately a 45 degree angle of engine rotation from start of charge recirculation to cut off.

Another feature of the invention is the recirculating manifold 9 with high load throttling valve 10 that limits charge recirculation into feed manifold 34 as extra power is needed. In the light load range the high load valve 10 is wide open as pictured in Fig. 1 and provides only a portion of the feed charge for combustion. In the high load range the high load valve 10 is partially closed as pictured in Fig. 4 and provides a larger portion of the feed charge for combustion. In the heavy load range the high load valve 10 is closed as pictured in Fig. 2 and provides full, undiluted feed charge for combustion.

Closing the high load valve 10 increases the compression in the recirculating manifold 9. The increase in compression may be used to modulate, through the connector 35, the compression spark retard actuator, not shown, to prevent detonation as load increases. The maximum compression in the recirculating manifold 9 is reduced as atmospheric pressure is reduced at higher altitude so the spark is less retarded with higher altitude. Thus the use of a compression spark retard actuator made practical by the compression through the cycle valve feature of this invention varies the spark timing toward maximum thermal efficiency with increase in altitude above sea level at heavy load and thus helps sustain sea level maximum power at the higher altitude.

*Coordination control.*—In the light load range the high load valve is linked so it remains open as throttle is opened. In the high load range the high load valve is linked to start closing at further throttle opening and to close before full load throttle. In the heavy load range the high load valve is linked so it is held closed during further throttle advance to full load throttle. In the high load range the feed volume through the throttle 32 plus feed volume through high load valve 10 should be less than that which causes blow-through charging. This volume, in the spark retard portion of the high load range, should be as near blow-through charging as practical for a condition to permit most efficient spark timing. In Fig. 4 the high load valve elastic member or spring 11 tends to hold the high load valve 10 open. A linkage 12 connects the high load valve 10 to the throttle 32 so the high load valve 10 starts to close as throttle 32 is advanced from a partially open position. The length of linkage 12 is only long enough to provide maximum power without excessive waste from blow-through charging. A spring 13 shortens the effective length of linkage 12 just enough to prevent blow-through charging and provide stretch so throttle 32 can be advanced to the point of maximum power where slack portion of linkage 12 becomes taut. At light load, the throttle is moved to position 32a which causes high load valve to take position 10a causing linkage 12 to become slack (not shown). At full load, the throttle is moved to position 32b which causes high load valve to take position 10b and spring 13 becomes stretched (not shown). The closing of high load valve 10 is coordinated with the opening of throttle 32 so that the total flow volume per engine cycle increases as the advancing throttle closes the high load valve. The total volume flow per engine cycle at optimum coordination becomes constant as the advancing throttle 32 closes the high load valve 10 to the verge of a shut position during a constant speed of the engine.

*Optional speed coordination.*—When speed is greatly reduced at a constant throttle setting during high load, the pump 31 may increase each feed charge and cause waste from blow-through charging. This may be prevented by advancing the high load valve 10 relative to the throttle 32 for the lower speed. This may be done with a speed actuator 14. The speed actuator controller is shown in position 15 for high speed, and in position 15c for low speed. The controller in position 15c causes linkage 12 to take position 12c for maximum power at this lower speed. (Connecting the controller hole 16 to throttle hole 17 with a linkage, not shown, tends to limit extreme speed of the engine.)

*A four cycle application (not shown).*—The usual vacuum spark retard actuator has the disadvantage of lowering the thermal efficiency at heavy load through an increasingly wider power range at increasing altitude above sea level. The feed charge for combustion is primarily controlled by this intake manifold vacuum in the usual four cycle engine, while the feed charge for combustion is primarily controlled by recirculation manifold compression in the two cycle engine of this invention.

The usual four cycle engine may be modified with one cycle valve to produce and use this compression for the entire purpose of actuating the spark retard. This cycle valve is opened for compression variation "bleed" during a short interval of the corresponding cylinders compression stroke. Only one cycle valve, which may be small, is necessary in such an engine of one or more cylinders. This "compression" spark retard makes practical a still higher compression ratio as it lessens power-fade due to altitude and improves fuel economy when operating under heavy load at increased altitude.

I claim:

1. In a two stroke cycle spark ignition engine, the combination with cylinders, an intake manifold therefor, a recirculating manifold establishing flow communication between said cylinders and said intake manifold for expelling excess charge into intake manifold, a high load valve for limiting the flow of the expelled charge from the recirculating manifold into intake manifold as more combustion for more power is needed, a throttle that controls the flow of new charge into intake manifold, a throttle linkage that co-ordinates the closing rate of high load valve with opening rate of throttle so that within the high load valve effective closing range the sum total flow per cycle into intake manifold as high load valve is closing increases at a minimum during a constant engine speed, an engine driven speed actuator, a speed actuator linkage that co-ordinates the closing rate of high load valve with reduced speed of engine so that within the high load valve effective closing range at any constant throttle setting the sum total flow through the high load valve into intake manifold is approximately constant per cycle at any working speed of the engine.

2. In a two stroke cycle spark ignition engine, the combination with cylinders, an intake manifold therefor, intake and exhaust valves which control the admission of initial cylinder charge from said intake manifold and the exhaust of burned gas from said cylinders, a recirculating manifold which establishes flow communication between said cylinders and said intake manifold, a valve means which controls discharge of a portion of the initial cylinder charge into said recirculating manifold during a portion of the compression stroke of each cylinder of the engine, a high load valve which reduces the discharge from recirculating manifold into intake manifold during a high load on the engine, a throttle which controls the flow of new charge into intake manifold, said high load valve and said throttle linked so that high load valve changes from open position to closed position as throttle advances from a partially open position to a larger opening position.

References Cited in the file of this patent

UNITED STATES PATENTS

| | | |
|---|---|---|
| 1,046,738 | Cross | Dec. 10, 1912 |
| 1,384,133 | Howe | July 12, 1921 |
| 1,402,573 | Clark | Jan. 3, 1922 |
| 2,292,233 | Lysholm | Aug. 4, 1942 |

FOREIGN PATENTS

| | | |
|---|---|---|
| 676,001 | Germany | May 25, 1939 |
| 735,002 | Germany | May 4, 1943 |